US012527714B1

(12) United States Patent
Wu et al.

(10) Patent No.: US 12,527,714 B1
(45) Date of Patent: Jan. 20, 2026

(54) SEXUAL STIMULATION DEVICE

(71) Applicant: HYTTO PTE. LTD., Singapore (SG)

(72) Inventors: Zhiwen Wu, Guangzhou (CN); Kaixiang Fang, Guangzhou (CN); Bin Lu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 19/244,893

(22) Filed: Jun. 20, 2025

Related U.S. Application Data

(63) Continuation-in-part of application No. 35/525,289, filed on Apr. 30, 2025 (U.S. filing date under 35 U.S.C. 384), and having an international filing date of Apr. 30, 2025.

(51) Int. Cl.
*A61H 19/00* (2006.01)
*A61H 7/00* (2006.01)
*A61H 23/02* (2006.01)

(52) U.S. Cl.
CPC ............ *A61H 19/32* (2013.01); *A61H 7/005* (2013.01); *A61H 23/0254* (2013.01); *A61H 2201/0107* (2013.01); *A61H 2201/1207* (2013.01)

(58) Field of Classification Search
CPC ...................................................... A61H 19/32
See application file for complete search history.

(56) References Cited

U.S. PATENT DOCUMENTS 6,113,532 A * 9/2000 Yap ........................... A61F 5/41 600/38
2008/0065033 A1* 3/2008 Matsuura ............... A61H 9/005 604/349
2010/0041944 A1* 2/2010 Levy ...................... A61H 19/32 600/38
2010/0174257 A1 7/2010 Matsuura
2015/0065792 A1* 3/2015 Levine ................... A61H 19/32 600/38
2016/0135792 A1 5/2016 Cai

FOREIGN PATENT DOCUMENTS

CN 103767863 A 5/2014

* cited by examiner

*Primary Examiner* — Thaddeus B Cox
(74) *Attorney, Agent, or Firm* — Getech Law LLC; Jun Ye

(57) ABSTRACT

A sexual stimulation device includes a housing and a flexible massage body. The housing includes first and second housing portions and an expandable and contractible connector that connects the two housing portions. The flexible massage body is disposed within the housing, having a massage cavity for receiving a penis. The housing has first and second end portions opposite to each other and a middle portion therebetween. The connector includes a deformation portion that undergoes deformation when the first or the second housing portions are subjected to pressure. Also, a first projected length of the first housing portion or the second housing portion onto a plane perpendicular to the length direction and a second projected length of the flexible massage body in the same direction of the plane are substantially the same.

17 Claims, 20 Drawing Sheets

SEXUAL STIMULATION DEVICE

BACKGROUND

Cross Reference to Related Applications

This application is a continuation-in-part of U.S. patent application Ser. No. 35/525,289 filed on Apr. 30, 2025.

TECHNICAL FIELD

The present invention relates to the field of massaging devices, and more particularly, to sexual stimulation devices.

DESCRIPTION OF THE PRIOR ART

As a type of virtual reality equipment or smart toy, sexual stimulation devices have a positive effect in fields such as medical treatment, health management, and reducing sexual offenses. Common sexual stimulation devices include masturbators for men and vibrators for women. In the medical field, masturbators are also called semen collectors or sperm collectors. Semen collectors facilitate the healthy, safe, and rapid collection of semen from patients for testing male sexual function, sperm quality, or obtaining semen for artificial insemination. In the field of health management, sexual stimulation devices can help individuals understand their physical needs, relieve sexual depression or anxiety, improve the quality of sexual life, and reduce the risk of accidental pregnancy or sexually transmitted diseases, which is particularly practical for single people or those in long-distance relationships. In addition, through sexual stimulation devices, individuals can legally obtain avenues for sexual satisfaction, which can reduce the risk of sexual impulses leading to crime.

With existing male masturbators, it is difficult to achieve multi-directional and/or large-area massage stimulation effects on a penis, or, existing male masturbators have parts or portions that are difficult to clean and/or replace after use. Such shortcomings make it difficult for existing male masturbators to meet growing quality requirements of consumers.

SUMMARY

In one aspect of the disclosure, a sexual stimulation device is described. The sexual stimulation device includes a housing and a flexible massage body. The housing includes at least a first housing portion, a second housing portion, and an expandable and contractible connector connecting the first housing portion and the second housing portion. The flexible massage body is at least partially disposed within the housing, and inherently has a massage cavity for receiving a penis, or having a massage cavity when the housing is closed. The housing has a first end portion, a second end portion opposite to each other along its length direction, and a middle portion between the first end portion and the second end portion. The middle portion is substantially columnar in structure. The expandable and contractible connector includes a deformation portion. The deformation portion undergoes folding or compression deformation when the first housing portion or the second housing portion are subjected to pressure applied from outside of the housing towards inside of the housing. Also, a first projected length of the first housing portion or the second housing portion onto a plane perpendicular to the length direction and a second projected length of the flexible massage body in the same direction of the plane are substantially the same.

In another aspect of the disclosure, a sexual stimulation device is described. The sexual stimulation device includes a housing and a flexible massage body. The housing includes at least a first housing portion, a second housing portion, and an expandable and contractible connector connecting the first housing portion and the second housing portion. The flexible massage body is at least partially disposed within the housing, and inherently has a massage cavity for receiving a penis, or having a massage cavity when the housing is closed. The expandable and contractible connector includes a deformation portion. The deformation portion undergoes folding or compression deformation when the first housing portion or the second housing portion are subjected to pressure applied from outside the housing towards inside of the housing. The deformation portion is disposed at least partially along partial edges of at least one of the first housing portion and the second housing portion.

In yet another aspect of the present disclosure, a sexual stimulation device is described. The sexual stimulation device includes a housing and a flexible massage body. The housing includes at least a first housing and a second housing. The flexible massage body inherently has a massage cavity and an insertion opening for penis insertion and withdrawal. The flexible massage body is detachably disposed within the housing. The first housing and the second housing are connected by a non-screw quick connection mechanism. The quick connection mechanism achieves complete separation and secure engagement of the first housing and the second housing through quick disassembly and assembly, for convenient maintenance operations of the flexible massage body. A combined state of the first housing and the second housing after complete separation is switchable to one or more states different from when the first housing and the second housing are assembled.

In yet another aspect of the present disclosure, a sexual stimulation device is described. The sexual stimulation device includes a housing, a flexible massage body, a power component and a vibration component. The housing includes at least a first housing and a second housing that are detachably connected. The flexible massage body has a massage cavity for receiving a penis, or having a massage cavity when the housing is closed. The power component is disposed on the first housing. The vibration component is electrically connected to the power component and includes at least a first vibrator and a second vibrator. The first vibrator is disposed on the first housing and the second vibrator is disposed on the second housing or on a side of the flexible massage body away from the first vibrator. The second vibrator is electrically connected to the power component through an electrical connection element. The electrical connection element can be partially disposed on the second housing or on the flexible massage body by a fixed wiring method.

In yet another aspect of the present disclosure, a sexual stimulation device is described. The sexual stimulation device includes a housing, a flexible massage body, a power component, and a vibration component. The housing includes at least a first housing and a second housing detachably connected to each other. The flexible massage body includes a massage cavity for receiving a penis, or has a massage cavity when the housing is closed. The power component is disposed on the first housing. The vibration component is electrically connected to the power component and includes at least a first vibrator and a second vibrator. The first vibrator is disposed on the first housing and the second vibrator is disposed on the second housing or on a side of the flexible massage body away from the first vibrator. The second vibrator is electrically connected to the power component through an electrical connection element and the electrical connection element is partially disposed on the second housing or on the flexible massage body by a fixed wiring method.

DETAILED DESCRIPTION

Figure 1:
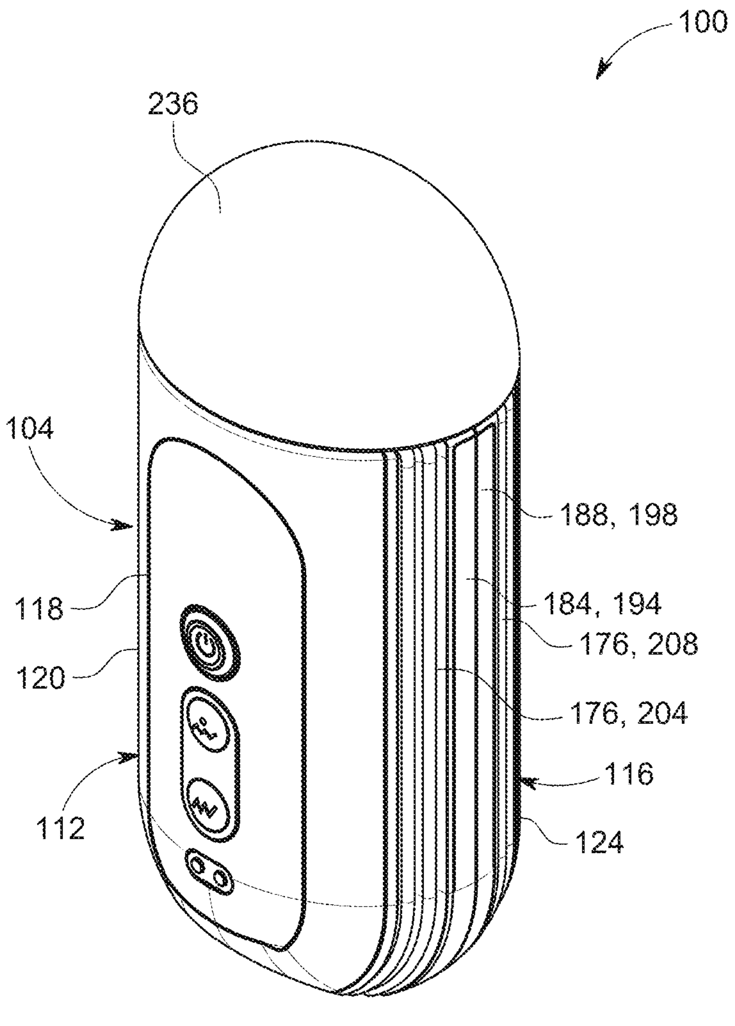
FIG. 1 is a perspective view of the sexual stimulation device, in accordance with an embodiment of the disclosure.
Figure 2:
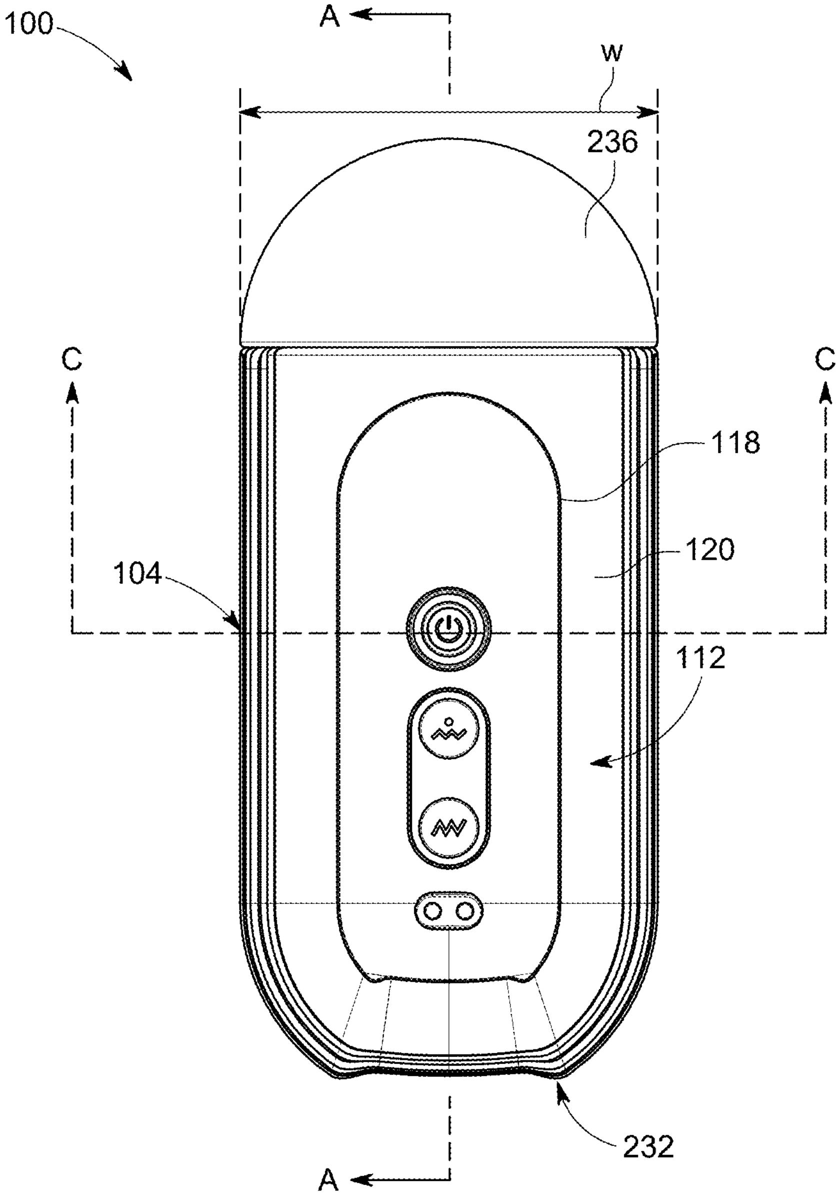
FIG. 2 is a front view of the sexual stimulation device, in accordance with an embodiment of the disclosure.
Figure 3:
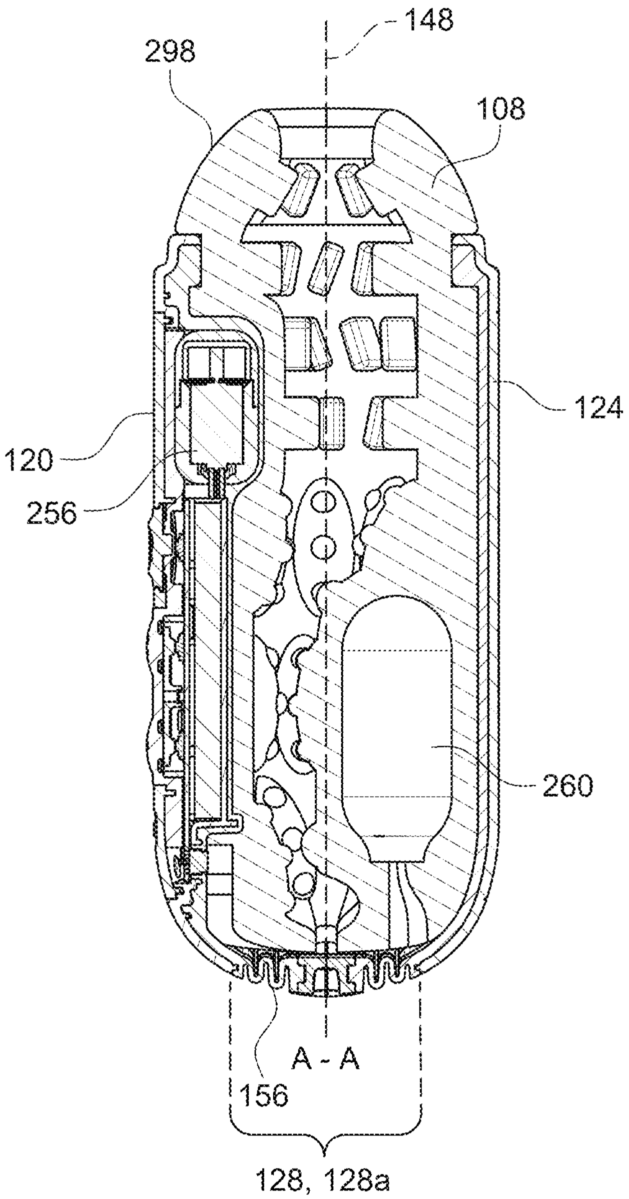
FIG. 3 is a cross-sectional view of the sexual stimulation device taken along line A-A of FIG. 2, in accordance with an embodiment of the disclosure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," or "comprising," when used in this specification, specify the presence of stated features, integers, steps, operations, elements, or components, but do not preclude the presence or addition of one or more other features, integers, steps, operations, elements, components, or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Referring to FIGS. 1 to 5, a sexual stimulation device 100 is described. The sexual stimulation device 100 and/or devices formed by applying one or more concepts from the present description can be used in a variety of applications, such as, but not limited to, artificial insemination from male subjects, semen or sperm collection for testing and/or sampling, sexual pleasure for men, etc.

Referring to FIGS. 1 to 5, a sexual stimulation device 100 is described. The sexual stimulation device 100 includes a housing 104 and a flexible massage body 108 (see FIGS. 3 and 5). The housing 104 includes a first housing 112 and a second housing 116. The first housing 112 includes a first housing portion 120 and the second housing 116 includes a second housing portion 124, and an expandable and contractible connector 128 (see FIG. 4) connecting the first housing portion 120 and the second housing portion 124. Buttons and/or switches to control the sexual stimulation device 100 may be provided on a control panel 118 of the first housing portion 120. The flexible massage body 108 is at least partially disposed within the housing 104 and has (or inherently has) a massage cavity 132 (e.g., see FIG. 5) (e.g., also see FIGS. 6, 7, 8, and 12) for receiving a penis, or has a massage cavity 132 when the housing 104 is closed. The housing 104 has a first end portion 136 and a second end portion 140 defined opposite to each other along a length direction, L, of the housing 104 (e.g., see FIG. 4). Further, a middle portion 144 extends between the first end portion 136 and the second end portion 140 (e.g., see FIGS. 4 and 8). As an example, the middle portion 144 is substantially columnar in structure, and thus may define a columnar structure 144*a*.

The expandable and contractible connector 128 includes a deformation portion 128*a*. The deformation portion 128*a* can undergo folding or compression deformation when the first housing portion 120 or the second housing portion 124 are subjected to pressure, P-P', applied from an outside of the housing 104 towards an inside of the housing 104. Moreover, the deformation portion 128*a* can be at least partially parallel to a longitudinal axis 148 (see FIG. 4) of the columnar structure 144*a* and/or to the length direction, L, of the housing 104. Also, the longitudinal axis 148 is parallel to the length direction, L, of the housing 104. A first projected length of the first housing portion 120 or the second housing portion 124 onto a plane perpendicular to the length direction, L, and a second projected length of the flexible massage body 108 in the same direction of the plane are substantially the same. In this regard, the middle portion 144 of the housing 104 is an elliptical cylinder, and thus a cross-section or a cross-sectional profile 150 of said elliptical cylinder includes an ellipse defining a major axis 146*a* and a minor axis 146*b* (also see FIGS. 9 and 16). The first projected length in a major axis direction of the elliptical cylinder or the ellipse, as an example, is marked as PL and the second projected length in the major axis direction of the elliptical cylinder or the ellipse, as an example, is marked as PL' (see FIGS. 5 and 16).

The term 'substantially', here or elsewhere, indicates that a difference between the first projected length, PL, and the second projected length, PL', is not particularly significant. As an example, the difference between the first projected length, PL, and the second projected length, PL', is less than 30% of the greater of the two projected lengths. In some embodiments, the difference between the first projected length, PL, and the second projected length, PL', is less than 10% of the greater of the two projected lengths. In some embodiments, the difference between the first projected length, PL, and the second projected length, PL', is less than 5% of the greater of the two projected lengths.

As part of the technical solution, the deformation portion 128*a* undergoes folding or compression deformation when the first housing portion 120 or the second housing portion 124 are subjected to pressure applied from the outside of the housing 104 towards the inside of the housing 104. This allows the first housing portion 120 and the second housing portion 124 to move towards each other due to the folding or compression deformation of the deformation portion 128*a* when the first housing portion 120 or the second housing portion 124 are pressed, in turn squeezing and stimulating the flexible massage body 108 and causing stimulation to a penis accommodated within the flexible massage body 108. Furthermore, because the first projected length, PL, of the first housing portion 120 or the second housing portion 124 onto the plane perpendicular to the length direction, L, is substantially the same as the second projected length, PL', of the flexible massage body 108 in the same direction of the plane, the first housing portion 120 and the second housing portion 124 can have a relatively large overall area, for achieving a large-scale stimulation on the penis.

When pressing a local area of the housing 104 (e.g., only pressing a local area of the housing 104 with fingers of a user), the deformation portion 128*a* can drive the entire first housing portion 120 and second housing portion 124 to apply a relatively large-area squeezing stimulation to the flexible massage body 108, thereby providing a relatively large-area sexual stimulation effect for the penis when inserted or received within the flexible massage body 108. In addition, due to the presence of the expandable and contractible connector 128, the size of the housing 104, in the direction K, (see FIG. 4) perpendicular to its length direction, L, is adjustable, making it suitable for users with different penis sizes or penis thicknesses, thus improving device adaptability and usability.

Figure 16:
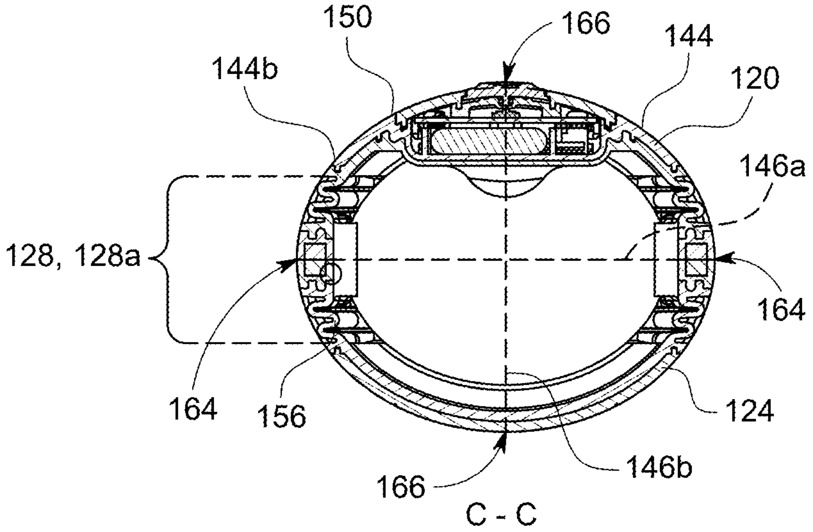
FIG. 16 is a cross-sectional view of the sexual stimulation device taken along line C-C of FIG. 2.
Figure 17:
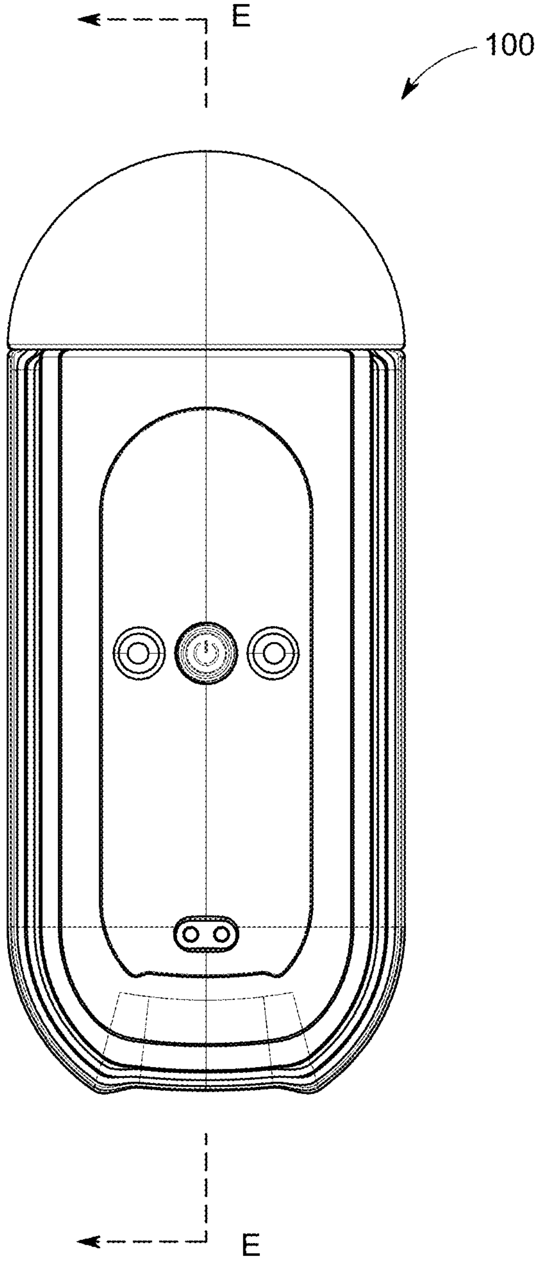
FIG. 17 is a front view of a sexual stimulation device, in accordance with an alternative embodiment of the disclosure.
Figure 18:
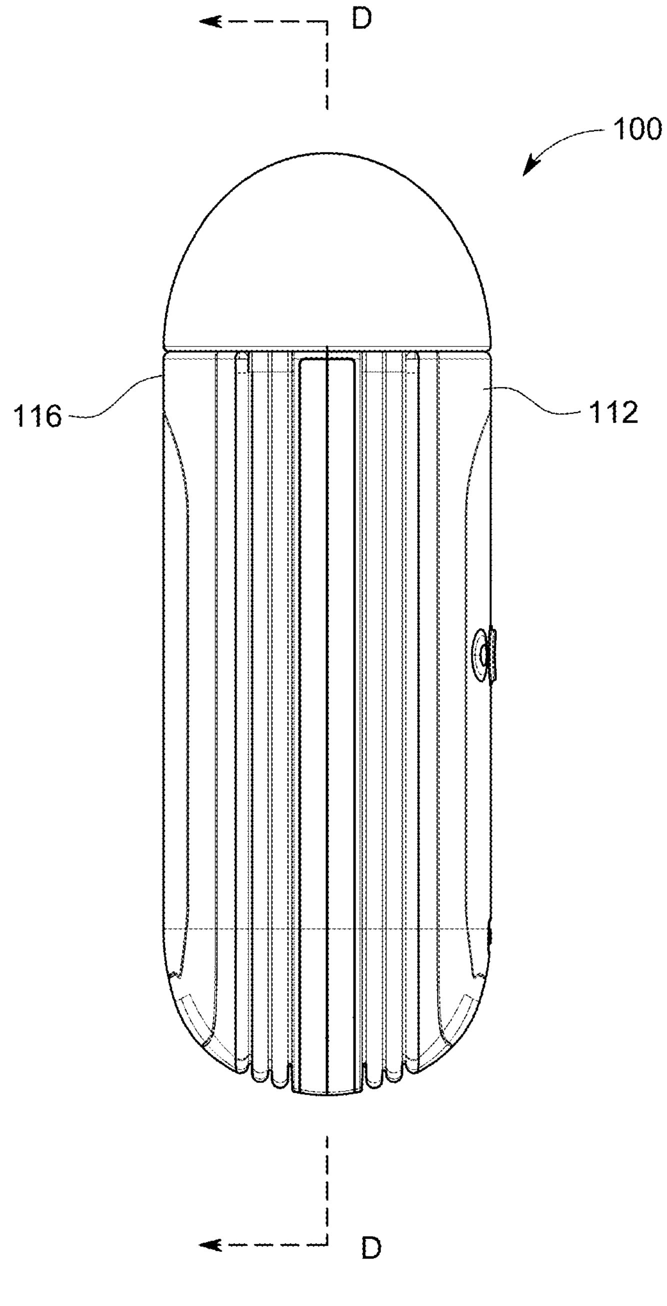
FIG. 18 is a left side view of the sexual stimulation device of FIG. 17.
Figure 19:
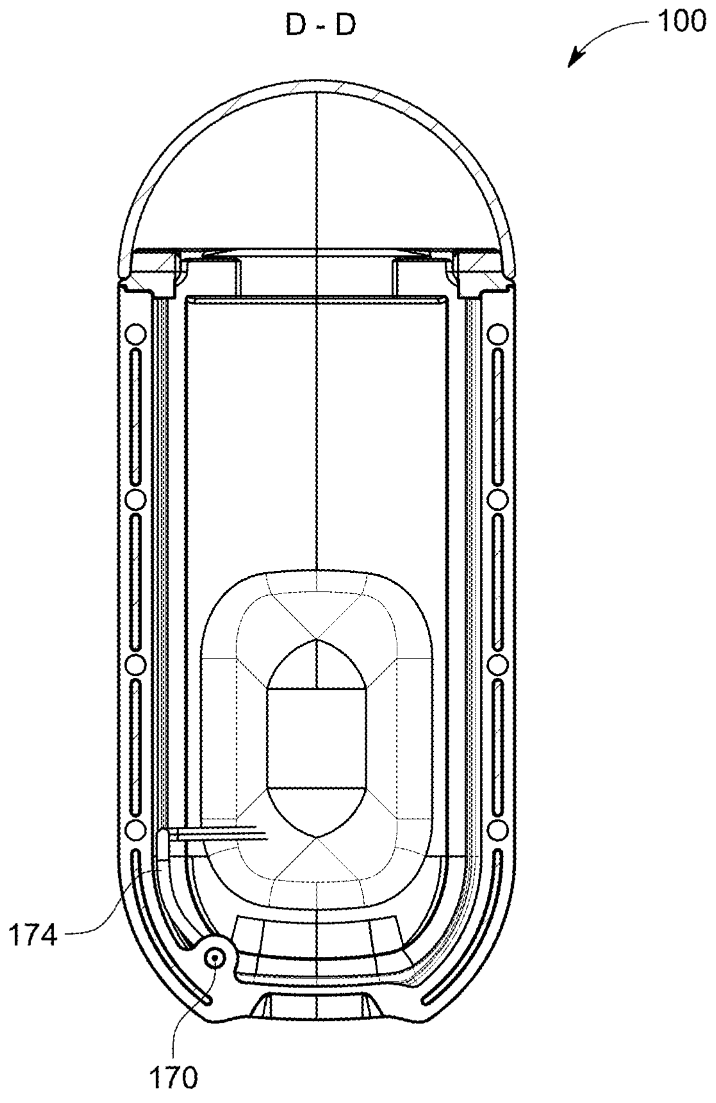
FIG. 19 is a partial cross-sectional view of the sexual stimulation device taken along line D-D of FIG. 18.
Figure 20:
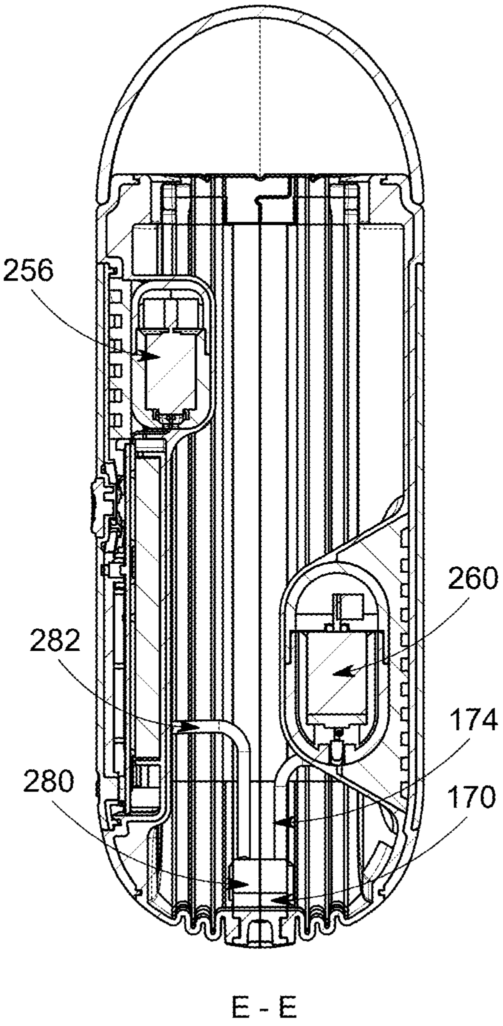
FIG. 20 is a cross-sectional view of the sexual stimulation device taken along line E-E of FIG. 17.

Referring to FIG. 16, a cross-section of the deformation portion 128*a* is shown. The cross-section of the deformation portion 128*a* has a corrugated or wave-like shape or a Z-shaped continuous broken line shape 156, as shown. These shapes can make the deformation portion 128*a* better undergo expansion or contraction, or, in other words, folding or compression deformation, allowing the first housing portion 120 and the second housing portion 124 to move away from each other (e.g., to accommodate a penis) or to move towards each other with relatively less force applied to the housing 104. Furthermore, compared to ordinary sheet-like soft connection members, the deformation portion 128*a* of this structure can better control the movement direction and speed of the first housing portion 120 and the second housing portion 124 when the housing 104 is subjected to pressure, achieving rhythmic squeezing stimulation of the flexible massage body 108 and thus the penis accommodated therewithin.

Further, the middle portion 144 substantially includes the elliptical cylinder structure 144*b*. The elliptical cylinder structure 144*b* can match the shape of the flexible massage body 108 and the penis, thereby substantially applying squeezing stimulation to the entire flexible massage body 108 and the entire penis when the housing 104 is pressed, e.g., in a rhythmic manner from the outside to the inside of the housing 104. This is because the first housing portion 120 and the second housing portion 124 of the elliptical cylinder structure 144*b* are curved surfaces, which not only wraps around the upper and lower surfaces of the flexible massage body 108 and the penis but also wraps around a large portion of the side surfaces of the flexible massage body 108 and the penis. More specifically, the corrugated or wave-like shape or Z-shaped continuous broken line shape 156 is overall arc-shaped to maintain the overall elliptical cylinder structure 144*b* of the housing 104.

Further, the deformation portion 128*a* is at least partially located at or near ends 164 of the major axis 146*a* (or, alternatively, at or near ends 166 of the minor axis 146*b*) of the elliptical cylinder structure 144*b* (see FIG. 16). For example, see the deformation portion 128*a* located at a major axis end 164 of the elliptical cylinder structure 144*b* in FIGS. 9 and 16. The location of the deformation portion 128*a* at or near the major axis end 164 or a minor axis end 166 (e.g., at the major axis end 164) (also see FIG. 16) can make it more convenient and labor-saving to press the housing 104 and cause the deformation portion 128*a* to deform per convenience during a stimulation activity.

Also, the ratio of the first projected length of the first housing portion 120 or the second housing portion 124 onto the plane perpendicular to the length direction, L, (see FIG. 4) to the second projected length of the flexible massage body 108 in the same direction of the plane is 0.7 to 1.3 or anywhere between 0.7 to 1.3. With this design, the first projected length, PL, of the first housing portion 120 or the second housing portion 124 in the major axis direction (see FIGS. 5, 9, and 16) is similar or substantially same to the second projected length, PL', of the flexible massage body 108 in said major axis direction, allowing the housing 104 to apply squeezing stimulation to most areas of the flexible massage body 108.

Figure 4:
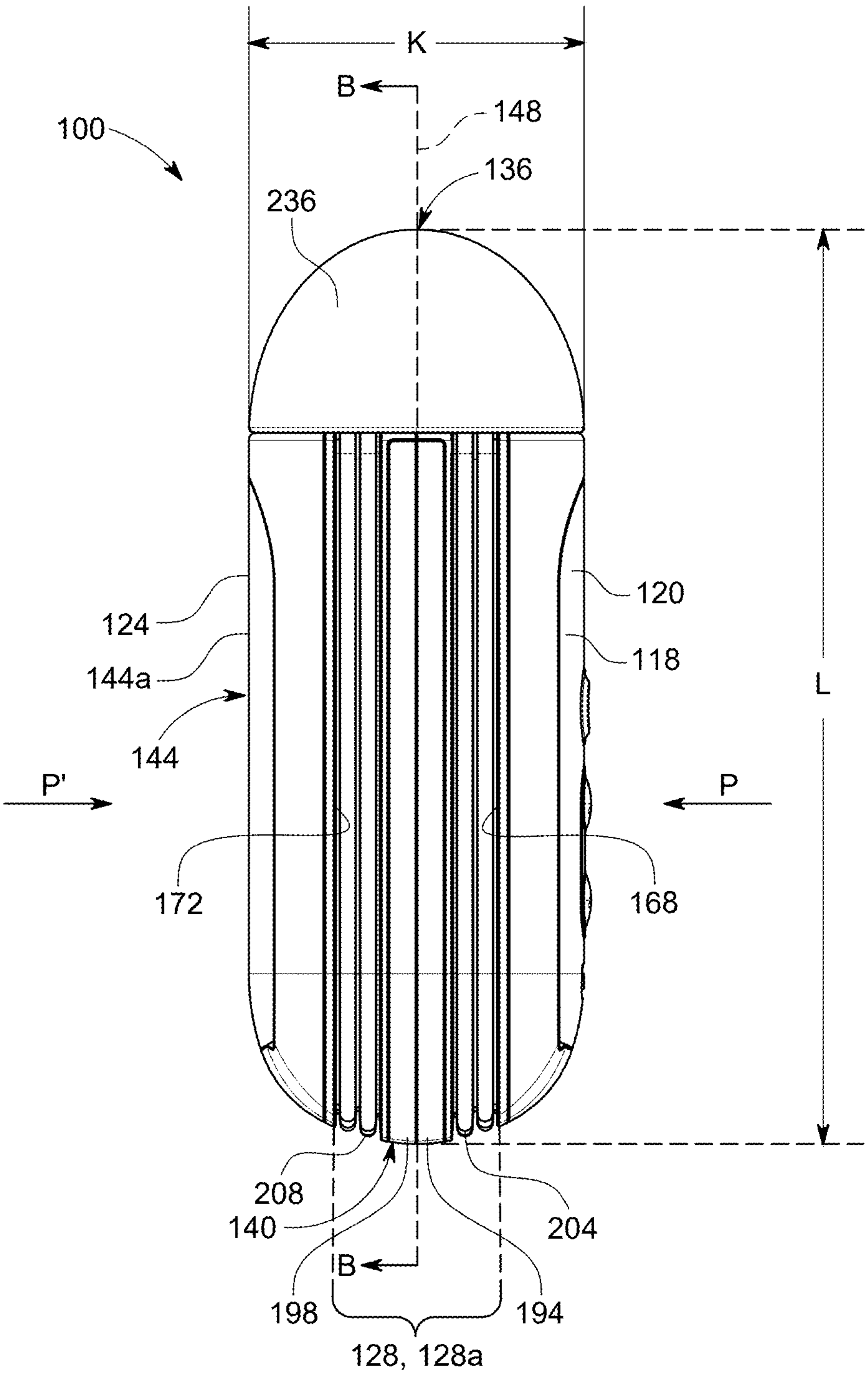
FIG. 4 is a left side view of the sexual stimulation device, in accordance with an embodiment of the disclosure.
Figure 5:
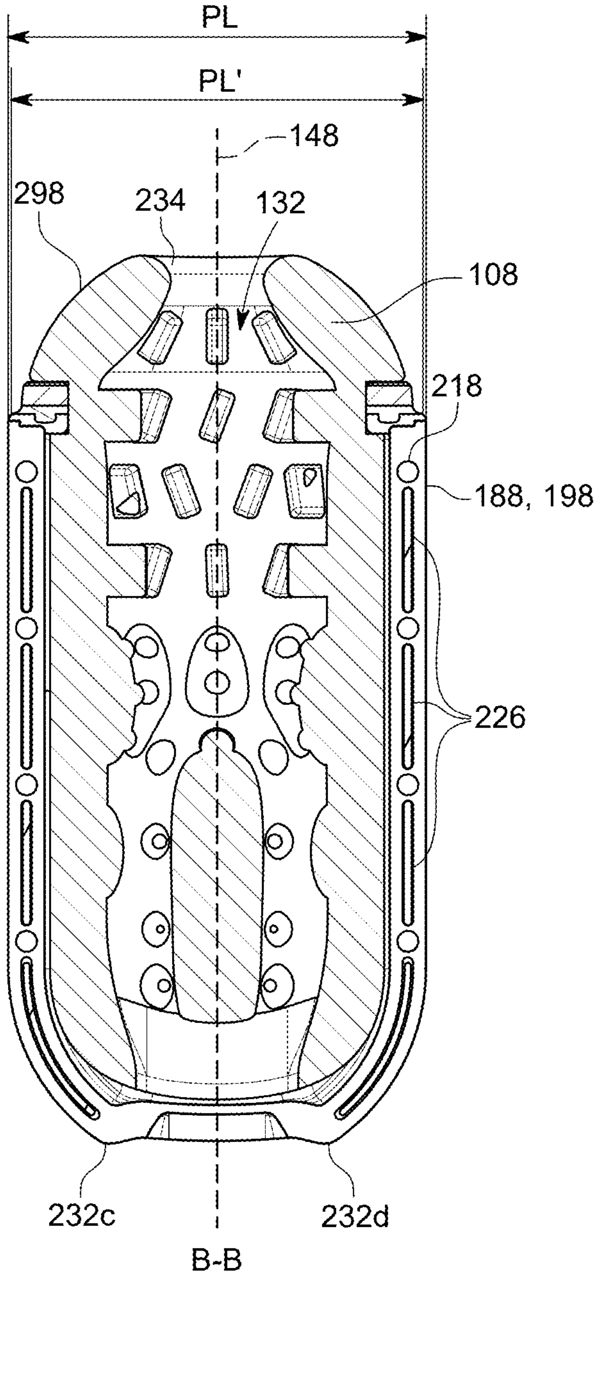
FIG. 5 is a cross-sectional view of the sexual stimulation device taken along line B-B of FIG. 4, in accordance with an embodiment of the disclosure.
Figure 6:
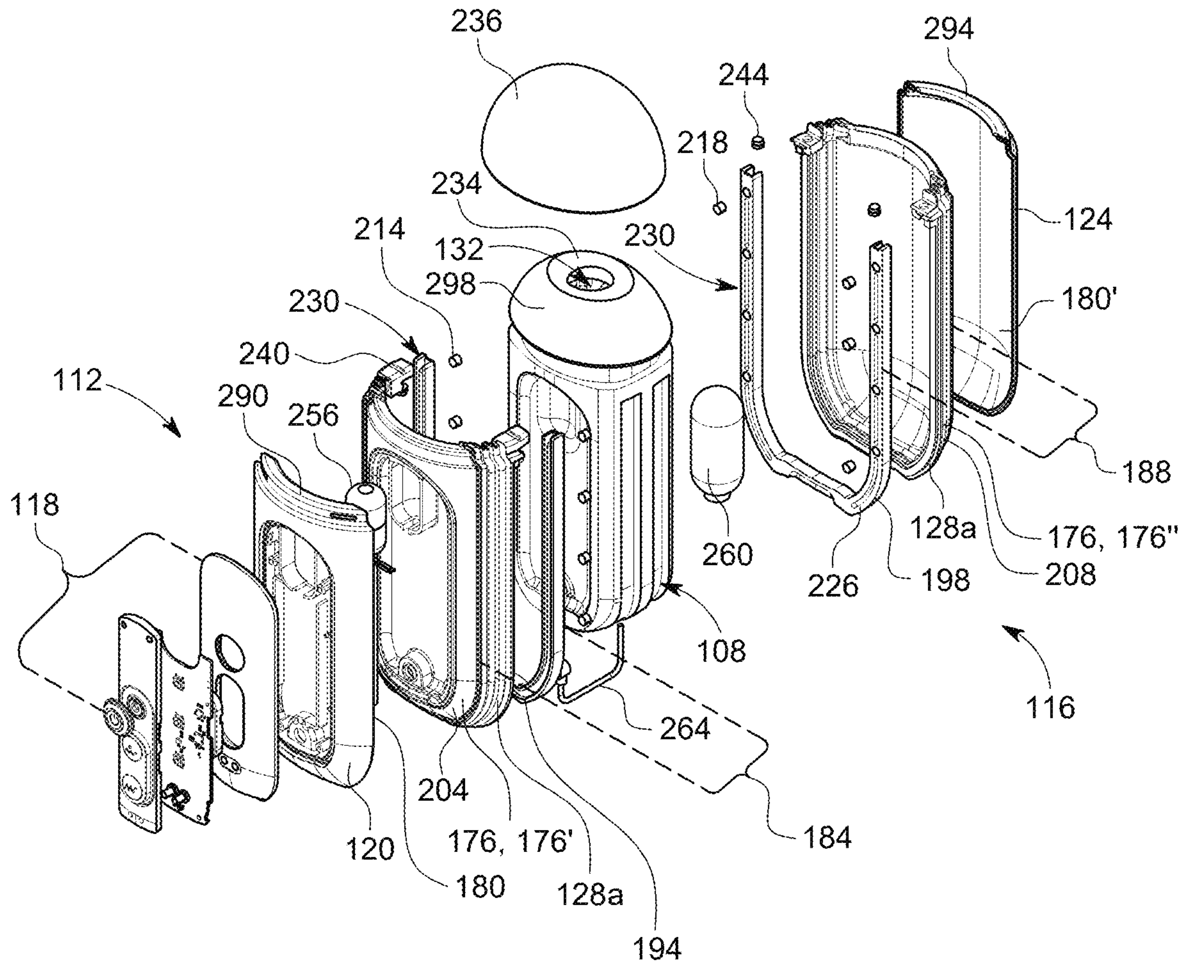
FIG. 6 is a first exploded view of the sexual stimulation device, in accordance with an embodiment of the disclosure.
Figure 7:
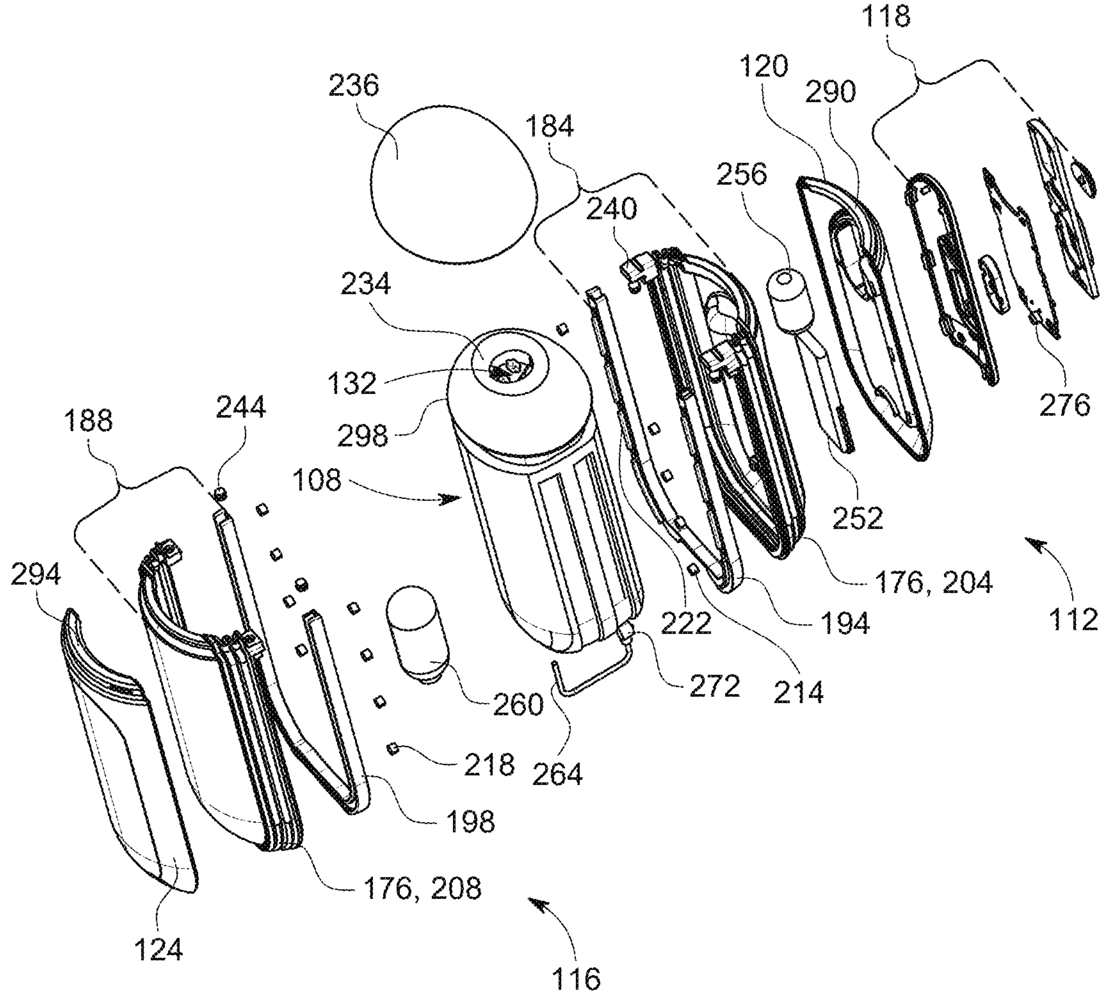
FIG. 7 is a second exploded view of the sexual stimulation device, in accordance with an embodiment of the disclosure.

Further, referring to FIGS. 6 and 7, an outer contour of the first housing portion 120 and the second housing portion 124 is substantially U-shaped, or an outer contour of the deformation portion 128*a* is substantially U-shaped (best visualized in the exploded views of FIGS. 6 and 7). Further, as shown in FIG. 4, the deformation portion 128*a* is located at least partially along the edges 168, 172 of the first housing portion 120 or the second housing portion 124, respectively, and an elastic portion 176 is at least partially closely attached to the inner walls 180, 180' (e.g., see FIG. 6) of the first housing portion 120 or the second housing portion 124. The flexibility of the elastic portion 176 is greater than that of the first housing portion 120 or the second housing portion 124, and the deformation capability of the deformation portion 128*a* is greater than that of the elastic portion 176. The elastic portion 176 can connect the deformation portion 128*a* and the first housing portion 120 or the deformation portion 128*a* and the second housing portion 124.

In some embodiments, the elastic portion 176 and the deformation portion 128*a* are integrally molded. The method of integral molding can reduce processing steps involved with manufacturing the sexual stimulation device 100. That is, the elastic portion 176 and the deformation portion 128*a* can be made of the same material, e.g., by casting a suitable material or a combination of materials into the same mold and/or e.g., by designing a part of it to be foldable or compressible (such as the corrugated or wave-like shape or a Z-shaped continuous broken line shape 156 in cross-section). Also, a material (or materials) of the elastic portion 176 and the deformation portion 128*a* can be selected such that the first housing portion 120 and the second housing portion 124 can apply squeezing stimulation to the flexible massage body 108 and the penis when subjected to relatively very little pressing pressure, and can return to their original shape when the pressure is removed or released. The material can include a polymer, silicone, a combination of these, and the like.

Figure 15:
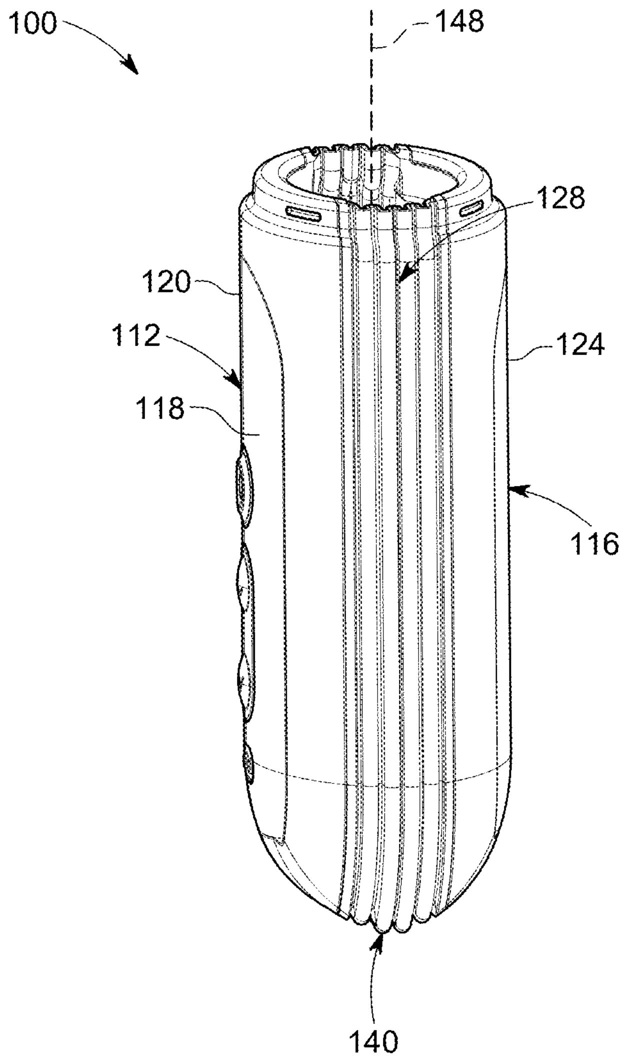
FIG. 15 is a view of a non-detachable housing, in accordance with an alternative embodiment of the disclosure.

Further, in this embodiment, the first housing portion 120 and the second housing portion 124 can be separable. To this end, the expandable and contractible connector 128 can include a first connection member 184 connected to the first housing portion 120 and a second connection member 188 connected to the second housing portion 124, and the first connection member 184 and the second connection member 188 are detachably connected. In other embodiments, the expandable and contractible connector 128 can also be a non-detachable structure, e.g., to define a non-detachable housing, as shown in FIG. 15.

In some embodiments, the first housing portion 120 and the second housing portion 124 can also be connected in an openable/closable manner. For example, the first housing portion 120 and the second housing portion 124 are rotatably connected on one side and separable on the other side. In so doing, the first housing portion 120 and the second housing portion 124 can be easily rotated or pivoted with respect to each other. Therefore, the first housing portion 120 and the second housing portion 124 can be switched between an open position and a closed position. In the open position, the user may gain access to the flexible massage body 108, e.g., to separate the flexible massage body 108 from the first housing portion 120 and the second housing portion 124, e.g., for washing or cleaning the flexible massage body 108. In the closed position, the sexual stimulation device 100 may be applied to stimulate the penis once the penis is inserted and accommodated into the housing 104 of the sexual stimulation device 100. In the open position, the flexible massage body 108 can also be suspended for drying.

Figure 12:
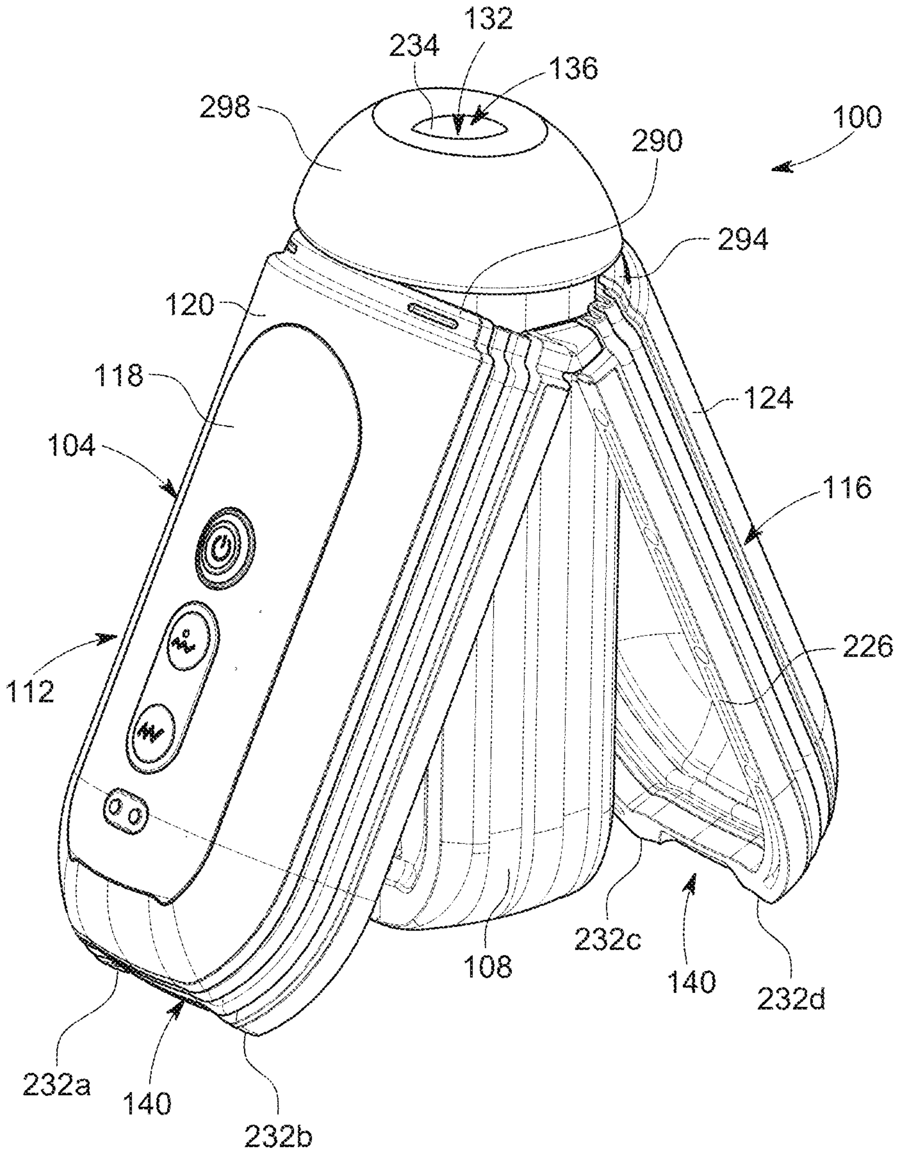
FIG. 12 is a view showing an exemplary state when the housing supports the flexible massage body, in accordance with an embodiment of the disclosure.

Referring to FIG. 12, in some embodiments, the first housing portion 120 and the second housing portion 124 can be rotatably moved to the open position to define an angle anywhere up to 60 degrees from each other. In some embodiments, the first housing portion 120 and the second housing portion 124 can be rotatably moved to the open position to define an angle anywhere up to 30 degrees from each other. In some embodiments, the first housing portion 120 and the second housing portion 124 can be rotatably moved to the open position to define an angle anywhere up to 120 degrees from each other. In some embodiments, the first housing portion 120 and the second housing portion 124 can be rotatably moved to the open position to define an angle anywhere up to 180 degrees from each other.

Further, as shown in FIGS. 5, 6, 7, and 11, in this embodiment, the first connection member 184 and the second connection member 188 (and thus the first housing portion 120 and the second housing portion 124) are connected by magnetic attraction, e.g., to each other. In this regard, the first connection member 184 includes a first connection portion 194, or the second connection member 188 includes a second connection portion 198. Each of the first connection portion 194 and the second connection portion 198 can include a suitable magnetic element (e.g., one including a magnet and the other including a magnetic coupler couplable to the magnet when attracted by the magnet's magnetic force) in turn enabling the first connection portion 194 and the second connection portion 198 to be connected to each other by magnetic attraction force.

The first connection portion 194 can be provided with one or more first magnetic elements 214, and, similarly, the second connection portion 198 is provided with one or more second magnetic elements 218 at a position opposite to the first magnetic elements 214. The first magnetic elements 214 and the second magnetic elements 218 may have opposite magnetic poles. The first magnetic elements 214 and the second magnetic elements 218 can include magnets.

The first connection member 184 can be provided with a first deformation portion 204, or the second connection member 188 can be provided with a second deformation portion 208 (e.g., see FIGS. 4 and 6). In a cross-sectional plane perpendicular to the length direction, L, of the housing 104, the cross-section of the first deformation portion 204 or the second deformation portion 208 has the corrugated or wave-like shape or a Z-shaped continuous broken line shape 156 (e.g., see FIG. 16). In this embodiment, the contour of the first connection portion 194 and the second connection portion 198 can be substantially U-shaped (e.g., see FIG. 6).

Further, as shown in FIGS. 5, 6, 7, and 11, in this embodiment, the first connection portion 194 is further provided with bar-shaped protrusions 222, and the second connection portion 198 is provided with grooves 226 matching the bar-shaped protrusions 222. Alternatively, the second connection portion 198 is provided with bar-shaped protrusions, and the first connection portion 194 is provided with grooves matching the bar-shaped protrusions.

A cooperation of the bar-shaped protrusions 222 and the grooves 226 can facilitate quick positioning when the first connection portion 194 and the second connection portion 198 are connected, achieving a snap-fit engagement (e.g., an initial snap-fit engagement), while the first magnetic elements 214 and the second magnetic elements 218 ensure the stability of the connection after engagement. As one example, the number of the first magnetic elements 214 and the second magnetic elements 218 can range anywhere between 2 to 10, and the bar-shaped protrusions 222 or grooves 226 and the first magnetic elements 214 or the second magnetic elements 218 are arranged at intervals. The bar-shaped protrusions 222 refer to the structure of the protrusions in the form of bars. The length direction of the bar-shaped protrusions 222 can be parallel to the longitudinal axis 148. Other manner of connection, now known or in the future developed, between the first connection portion 194 and the second connection portion 198 can be contemplated by those having skill in the art, and those connections are not exhaustively listed. Neither are they limited to those described in the present description.

In some embodiments, the first connection member 184 can include (e.g., a sequentially connected) first connection portion 194, first deformation portion 204, and a first elastic portion 176' (e.g., see FIG. 6). Similarly, or likewise, the second connection member 188 can include (e.g., a sequentially connected) a second connection portion 198, second deformation portion 208, and second elastic portion 176" (e.g., see FIG. 6). As shown, the first elastic portion 176' and the second elastic portion 176" are respectively closely attached to the inner wall 180 of the first housing portion 120 and the inner wall 180' of the second housing portion 124. The first deformation portion 204 and the first elastic portion 176' can be integrally molded, and the second deformation portion 208 and the second elastic portion 176"are integrally molded. In some embodiments, the expandable and contractible connector 128 may not include the second connection member 188, but may include only the first connection member 184, or may not include the first connection member 184, but may include only the second connection member 188.

Figure 9:
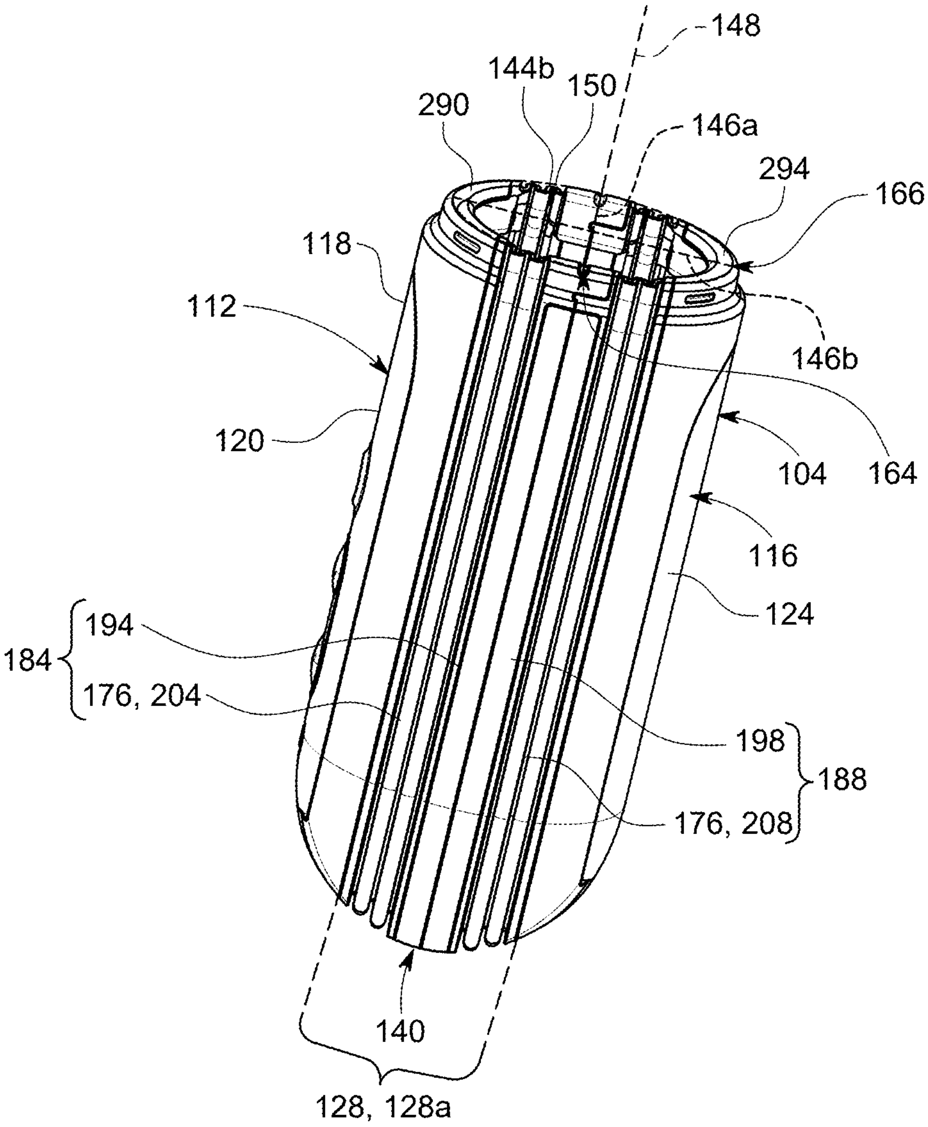
FIG. 9 is a perspective view of a housing of the sexual stimulation device, in accordance with an embodiment of the disclosure.

Further, as shown in FIG. 9, in some embodiments, the housing 104 includes the first housing 112 configured with the first housing portion 120 and the second housing 116 configured with the second housing portion 124. The first housing 112 and the second housing 116 can be detachably connected, e.g., to each other, and part of the flexible massage body 108 can be detachably disposed within the housing 104. This makes it easy to clean and replace the flexible massage body 108 as and when needed. The first housing 112 described in this embodiment includes both the first housing portion 120 and the first connection member 184, and, similarly, the second housing 116 includes the second housing portion 124 and the second connection member 188.

Further, the first housing 112 and the second housing 116 are connected by a non-screw quick connection mechanism 230. The quick connection mechanism 230 helps achieve complete separation and secure engagement of the first housing 112 and the second housing 116 through quick disassembly and assembly. This allows for quick disassembly and assembly of the first housing 112 and the second housing 116, for convenient maintenance operations of the flexible massage body 108. Further, a combined state of the first housing 112 and the second housing 116 after complete separation can be easily switched to one or more states different from when the first housing 112 and the second housing 116 are assembled. To this end, the first housing 112 and the second housing 116 can be combined in various or in multiple ways, which facilitates the management and maintenance of the flexible massage body 108, such as washing, replacement, drying, storage, etc., of the flexible massage body 108.

The quick connection mechanism 230 in this embodiment is a magnetic absorption component, which can be the first magnetic elements 214 and the second magnetic elements 218, described above. In other embodiments, the quick connection mechanism 230 can also be a buckle component. In some embodiments, the quick connection mechanism 230 can include a snap-fit connection, either alone or in combination with the first magnetic elements 214 and the second magnetic elements 218.

Further, as shown in FIG. 12, the housing 104 includes the first end portion 136 and the second end portion 140 opposite to each other along its length direction, L, and the housing 104 supports the flexible massage body 108 when the first end portion 136 is located at the top, the second end portion 140 is located at the bottom, and the first housing portion 120 and the second housing portion 124 are in an angled state. This arrangement (or angled arrangement) allows the first housing portion 120 and the second housing portion 124 to support the flexible massage body 108, which facilitates drying the flexible massage body 108, e.g., after a washing of the flexible massage body 108.

In this regard, in some embodiments, the second end portion 140 of the housing 104 can be provided with a support member for strengthening the support stability of the housing 104 for the flexible massage body 108. For example, the support member can include a non-slip support foot 232. As exemplarily shown in FIGS. 2, 5, 11, and 12, the non-slip support foot 232 can include or be formed by a number of protruding structures 232*a*, 232*b*, 232*c*, 232*d*, and these themselves can be an integral part of the housing 104. As an example, the protruding structures 232*a*, 232*b* can form part of the first housing 112 and the protruding structures 232*c*, 232*d* can form part of the second housing 116. The protruding structures 232*a*, 232*b*, 232*c*, 232*d* can enable the angled arrangement of the first housing portion 120 (or the first housing 112) and the second housing portion 124 (or the second housing 116) to be stably balanced and supported, e.g., on a flat or an even surface.

Also, in the angled state or angled arrangement, the first housing portion 120 and the second housing portion 124 may support the flexible massage body 108 in a hanging state (see FIG. 12). To this end, the first housing portion 120 and the second housing portion 124 may respectively define a first ledge 290 and a second ledge 294 at or near to the first end portion 136. When the first housing portion 120 and the second housing portion 124 are angled to each other in the angled state or the angled arrangement, a head 298 (that may define an insertion opening 234) (described below) of the flexible massage body 108 can rest atop the first ledge 290 and the second ledge 294 such that the first end portion 136 (and/or the first housing portion 120 and the second housing portion 124) can support the flexible massage body 108 in the hanging state. In some embodiments, a concavity matching the first end portion 136 is configured on the flexible massage body 108 near the insertion opening 234, so that the flexible massage body 108 can be clamped by the first end portion 136 and also supported by the housing 104 when the first housing 112 and the second housing 116 are in the angled state.

Further, a combined state of the first housing 112 and the second housing 116, e.g., as shown in FIG. 12, can be suitable for supporting the flexible massage body 108 for drying. In addition, the angle between the first housing 112 and the second housing 116 can vary to define various combined states when the first housing 112 and the second housing 116 are supporting each other. Additionally, it may be noted that multiple combined state of the first housing 112 and the second housing 116 can be defined when the first housing 112 and the second housing 116 pivot open with respect to each other, e.g., about an axis parallel to the longitudinal axis 148, to a pivoted state. Such combined states are suitable for the replacement and washing of the flexible massage body 108 because the flexible massage body 108 can be quickly removed from the housing 104 in such combined states. The pivoted opening between the first housing 112 and the second housing 116 can be attained by way of one or more connections, such as a buckle connection or a ball-and-socket connection or a hinged connection.

In some embodiments, the first housing 112 and the second housing 116 are altogether separable to define a combined state therebetween. In such a case, the flexible massage body 108 can be rested atop each of the first housing 112 and the second housing 116 for drying. Also, in some embodiments, a combined state of the first housing 112 and the second housing 116 is suitable for the storage of the flexible massage body 108.

In effect, the housing 104 of the sexual stimulation device 100 can be used itself to support the flexible massage body 108 for drying. It may be noted that the angled arrangement of the first housing portion 120 and the second housing portion 124 provides the flexible massage body 108 with some concealment or privacy. Depending upon factors, such as a material used for forming the flexible massage body 108, the flexible massage body 108 may not be suitable for a direct exposure to a drying source, in regular drying places (such as balconies, rooftops used for drying clothes, and the like), and there is usually no special object suitable for specifically drying flexible massage bodies 108. Rather, the sexual stimulation device 100 can directly use the housing 104 itself to support the flexible massage body 108 for drying, more detailly, with the non-slip support foot 232, the flexible massage body 108 can be dried by orienting and/or positioning the housing 104 of the sexual stimulation device 100 over any suitable surface (e.g., a flat surface) in the manner, i.e., the angled arrangement, as has been shown in FIG. 12, and thus by moving the flexible massage body 108 to the hanging state.

Figure 8:
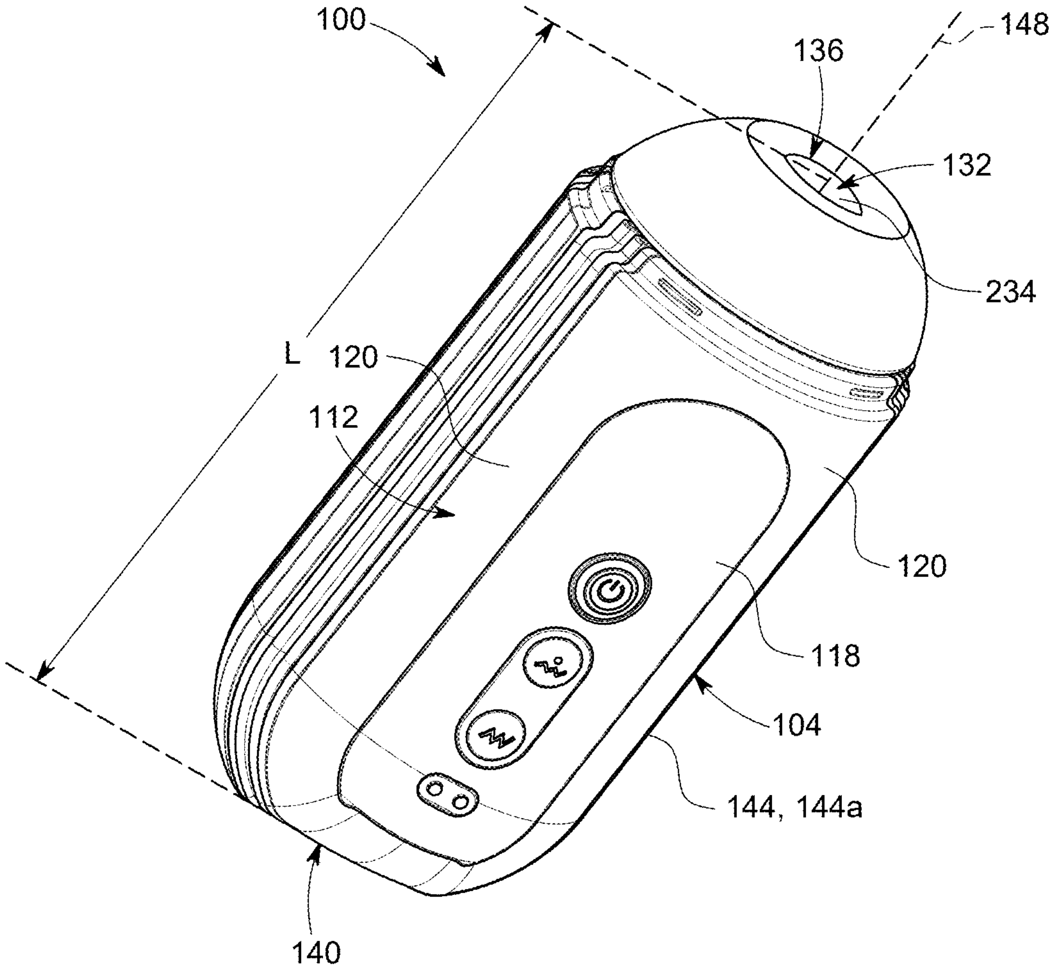
FIG. 8 is a perspective view of the sexual stimulation device with a cover of the device removed, in accordance with an embodiment of the disclosure.
Figure 10:
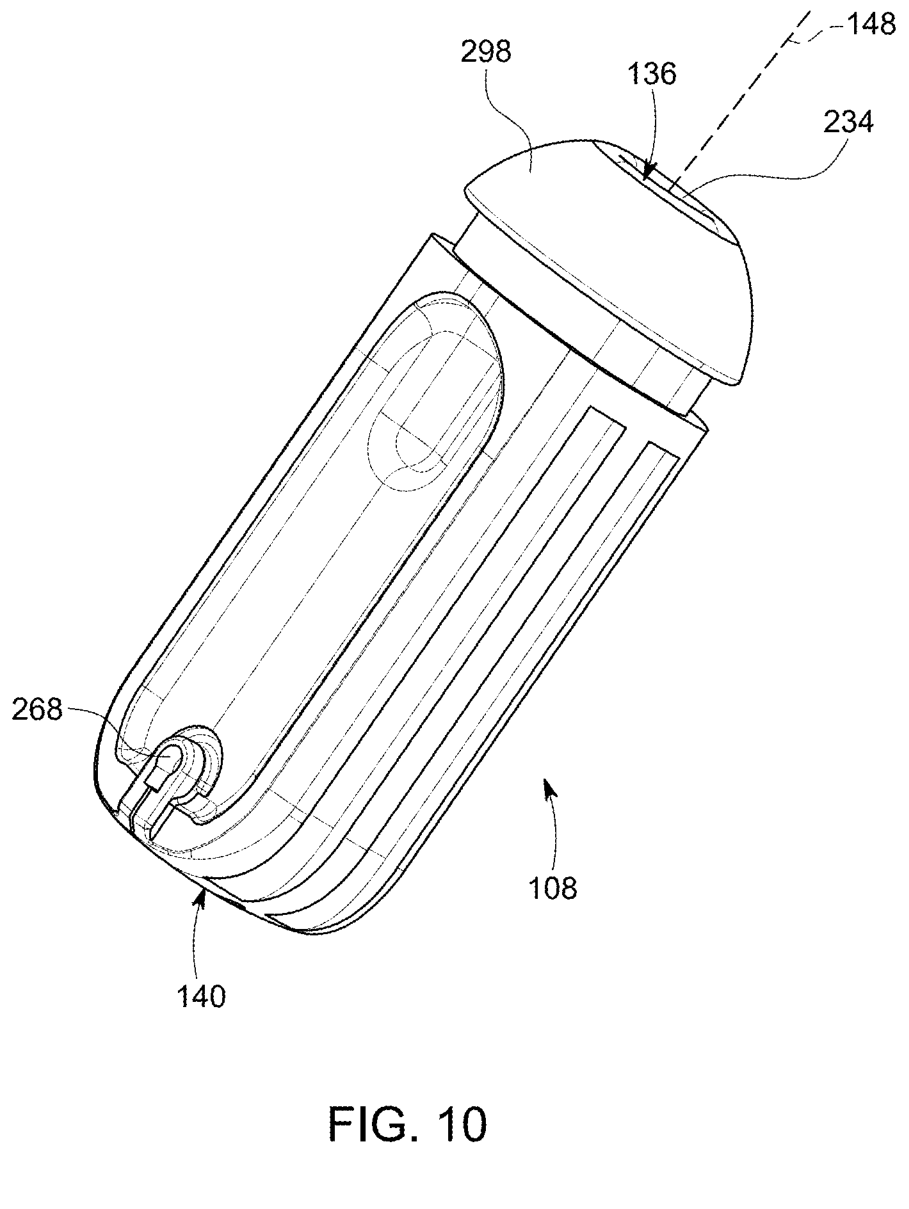
FIG. 10 is a perspective view of a flexible massage body of the sexual stimulation device, in accordance with an embodiment of the disclosure.
Figure 11:
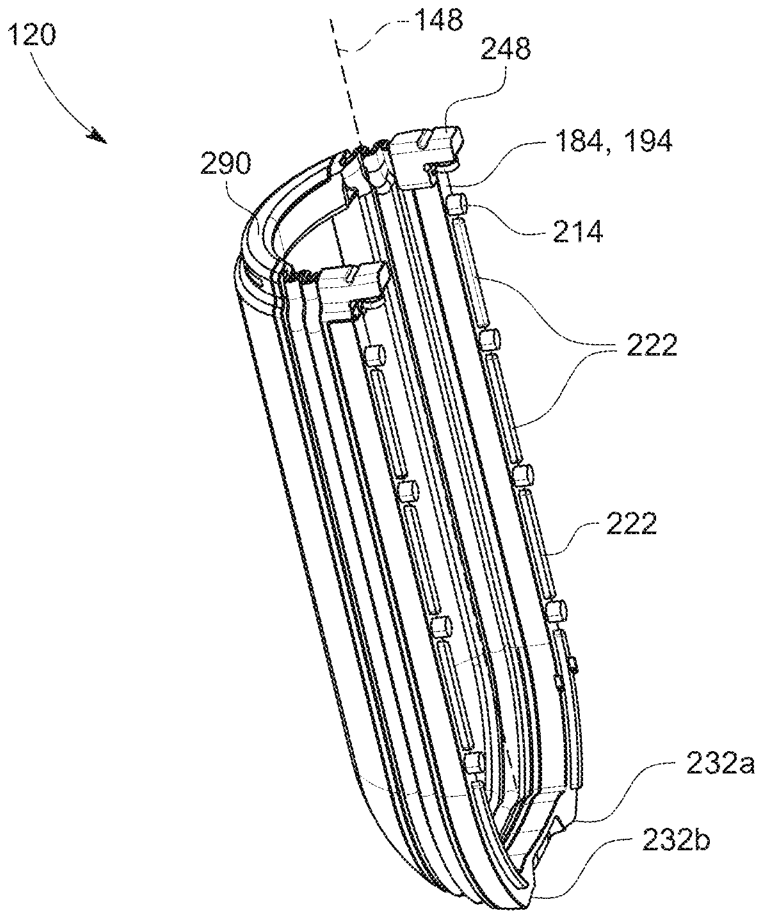
FIG. 11 is a perspective view of a first housing portion of the sexual stimulation device, in accordance with an embodiment of the disclosure.

Further, as shown in FIGS. 8, 10, and 12, the flexible massage body 108 has an insertion opening 234 for penis insertion and withdrawal, and the insertion opening 234 is near the first end portion 136. A portion of the flexible massage body 108 around the insertion opening 234 can be soft and flexible enough to ensure an easy insertion and withdrawal of the penis therefrom. As an example, the insertion opening 234 protrudes from the first end portion 136. A cover 236 and includes a converging profile to define the insertion opening 234. A cover 236 may be provided over the insertion opening 234. Also, the first housing portion 120 and the second housing portion 124 are rotatably connected at or near to the first end portion 136. When the first housing portion 120 and the second housing portion 124 are rotatably connected at or near to the first end portion 136, the first end portion 136 supports the flexible massage body 108, and the second end portion 140 serves as a supporting base, e.g., by way of the non-slip support foot 232. In this regard, with reference to FIG. 12, sections of the second end portion 140 can be split or separated, e.g., into 2, to move away from each other and form the angled arrangement described above, in order to serve as the supporting base. Since the first housing 112 and the second housing 116 (or the first housing portion 120 and the second housing portion 124) are rotatably connected at or near to the first end portion 136, the support of the first housing 112 and the second housing 116 for the flexible massage body 108 can be relatively stable.

Further, the other end of the flexible massage body 108, opposite to its insertion opening 234, my include a gap (e.g., from the bottom) when the housing 104 is in the angled state or angled arrangement, with the first end portion 136 at the top and the second end portion 140 at the bottom. This allows the flexible massage body 108 to be suspended for drying, ensuring cleanliness and hygiene for repeated or subsequent usage. Further, the other end of the flexible massage body 108 opposite to the insertion opening 234 can be provided with a drainage opening, such that a washing liquid used to wash the flexible massage body 108 can drain out, e.g., under gravity, and the design of the drainage opening can make the flexible massage body 108 dry faster during a drying process.

In some embodiments, the first housing 112 and the second housing 116 are connected at the first end portion 136 by a magnetic component. The magnetic component can include a third magnetic element 240 (e.g., see FIG. 7) disposed on the first end portion 136 of the first housing 112 and a fourth magnetic element 244 (e.g., see FIG. 7) disposed on the first end portion 136 of the second housing 116. The third magnetic element 240 and the fourth magnetic element 244 can be engaged by magnetic attraction force, and at least one of the third magnetic element 240 and the fourth magnetic element 244 can be disposed on a flexible structure 248 (e.g., see FIG. 11). The magnetic elements 240, 244 can allow the first housing portion 120 (or the first housing 112) and the second housing portion 124 (or the second housing 116) to be rotatable, while also allowing them to be detached from each other in some cases to release (e.g., altogether release) the flexible massage body 108 from the housing 104 of the sexual stimulation device 100.

The flexible structure 248 can undergo bending deformation when the first housing 112 and the second housing 116 are rotated relative to each other, so that the first housing 112 and the second housing 116 can remain connected at or near to the first end portion 136 when rotated relative to each other. As an example, the third magnetic element 240 can be disposed on the first deformation portion 204 and the fourth magnetic element 244 can be disposed on the second deformation portion 208. Effectively, the flexible structure 248 can be a part of the first deformation portion 204, and it can protrude from the first connection portion 194. In some embodiments, the second deformation portion 208 can be provided with a notch that matches with the flexible structure 248. The third magnetic element 240 can be disposed on the flexible structure 248, and the fourth magnetic element 244 can be disposed in the notch.

Figure 13:
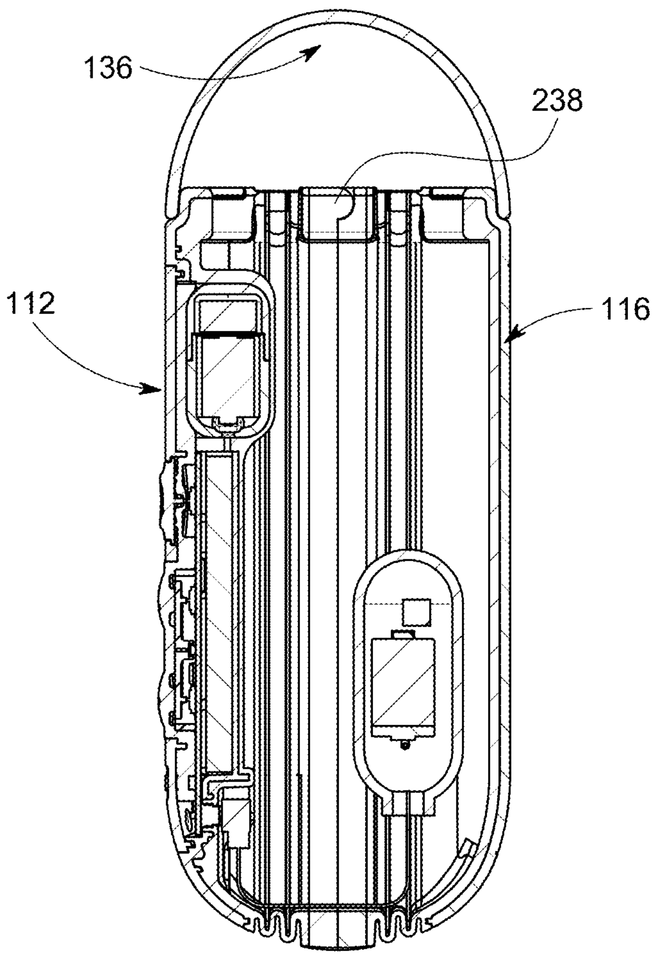
FIG. 13 is a cross-sectional view of a sexual stimulation device in hinged mode, in accordance with an alternative embodiment of the disclosure.
Figure 14:
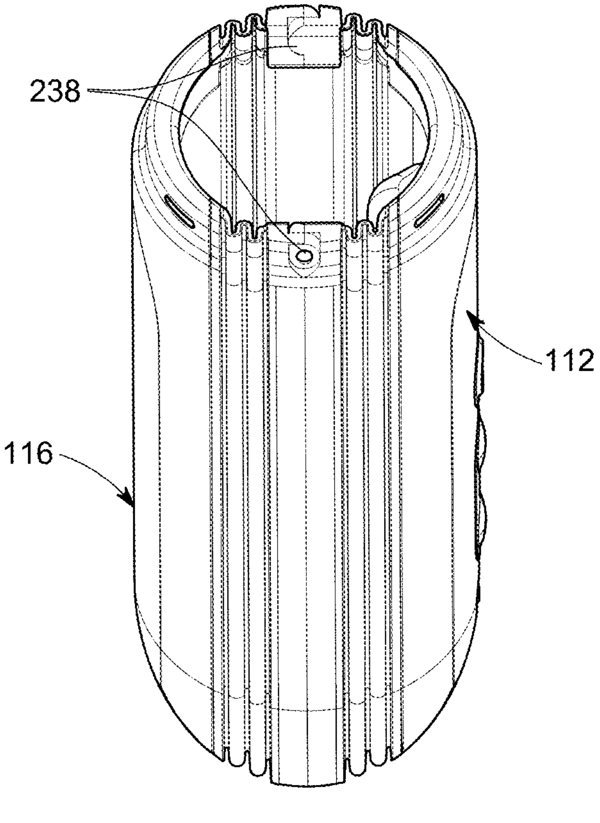
FIG. 14 is a view of a housing in hinged mode, in accordance with FIG. 13.

In some embodiments, the first housing 112 and the second housing 116 can also be hinged at or near to the first end portion 136, as shown in FIGS. 13 and 14 to define a hinged mode of the sexual stimulation device 100. To this end, the first housing 112 can be provided with a ring-shaped rotating portion 238 (e.g., see FIG. 13) at the first end portion 136. To this end, the second housing 116 can be provided with a short shaft (not shown) at the first end portion 136, the center of the ring-shaped rotating portion 238 can be penetrated by the short shaft, and the two can be detachably connected and the ring-shaped rotating portion 238 can rotate around the short shaft to cause the first housing 112 and the second housing 116 to be rotated or pivoted with respect to each other, and, for example, attain the angled arrangement described above.

In some embodiments, the first housing 112 and the second housing 116 can also be connected by one or more of a magnetic attraction connection or a buckle connection or a ball-and-socket connection or a hinged connection at the first end portion 136 (hinged mode). For example, the first housing 112 can be provided with a ball-shaped joint or a hemispherical joint at the first end portion 136, and the second housing 116 can be provided with a groove opening matching the ball-shaped joint or the hemispherical joint. Alternatively, the second housing 116 can be provided with a ball-shaped joint or a hemispherical joint at the first end portion 136, and the first housing 112 can be provided with a groove opening matching the ball-shaped joint or the hemispherical joint. The ball-shaped joint or the hemispherical joint can be rotatably engaged in the groove opening.

Further, the sexual stimulation device 100 includes a power component 252 (see FIG. 7) and a vibration component electrically connected to the power component 252 to receive power from and/or be powered by the power component 252. The power component 252 can include a battery, e.g., a rechargeable battery. The vibration component includes at least a first vibrator 256 and a second vibrator 260, as shown. As an example, the first vibrator 256 imparts vibration to a side of the flexible massage body 108 close to the first housing portion 120 when powered by the power component 252 and the second vibrator 260 imparts vibration to another side of the flexible massage body 108 close to the second housing portion 124 when powered by the power component 252.

The power component 252 and the first vibrator 256 are disposed on the first housing 112 and the second vibrator 260 is disposed on the second housing 116 or on a side of the flexible massage body 108 away from the first vibrator 256. As is shown in FIG. 6, the first vibrator 256 is disposed between the first housing portion 120 and the first connection member 194. More detailly, the first vibrator 256 is disposed relatively close to the first elastic portion 176'. Further, the second vibrator 260 is electrically connected to the power component 252 through an electrical connection element. The electrical connection element can be partially disposed on the second housing portion 124 or on the flexible massage body 108, e.g., by a fixed wiring method. As an example, the electrical connection element or the fixed wiring includes a wire 264 (e.g., see both FIGS. 6 and 7).

In some embodiments, the second vibrator 260 is disposed on the flexible massage body 108, and the second vibrator 260 is electrically connected to the power component 252 through the wire 264. The flexible massage body 108 is provided with a wire slot 268 for holding the wire 264, as shown in FIG. 10. Further, the wire 264 is connected to the power component 252 through a magnetic conductive element. Specifically, the magnetic conductive element includes a first metal contact 272 (e.g., see FIG. 7) disposed on the wire 264, and the first housing 112 is provided with a second metal contact 276 (e.g., see FIG. 7). The first metal contact 272 and the second metal contact 276 can attract each other and conduct electricity therethrough upon contact. Adopting this fixed wiring method, the wires are pre-fixed without any loose or excessively exposed wires. Once the first housing 112 and the second housing 116 are closed, the power component 252 can directly supply electricity to the second vibrator 260 without manual wire alignment, which ensures convenient charging and an aesthetically pleasing product.

In some embodiments, the second vibrator 260 can also be disposed on the second housing 116. The electrical connection element (e.g., magnetic conductive element) is partially disposed on the second housing 116. When the first housing 112 and the second housing 116 are closed, they are electrically connected through the electrical connection element (e.g., magnetic conductive element). The electrical connection element includes one or more metal contacts, as shown in FIGS. 17, 18, 19, and 20 (for convenience of observation, the flexible massage body 108 is hidden or not displayed in FIG. 19 and FIG. 20). As an example, the electrical connection element (e.g., magnetic conductive element) includes a third metal contact 280 disposed on the edge of the first housing 112 and a fourth metal contact 170 disposed on the edge of the second housing 116. The second vibrator 260 is disposed between the second housing portion 124 and the second connection member 188 and is connected to the fourth metal contact 170 through a second wire 174 (which can be similar or same as the wire 264). The power component 252 is connected to the third metal contact 280 through a first wire 282, and the third metal contact 280 and the fourth metal contact 170 are electrically conductive once in contact, thus resulting in an electrical connection between the second vibrator 260 and the power component 252. The first housing 112 and the second housing 116 are also electrically connected through the third metal contact 280 and the fourth metal contact 170. Adopting this fixed wiring method, the wires are also pre-fixed without any loose or excessively exposed wires. Once the first housing 112 and the second housing 116 are closed, the power component 252 can directly supply electricity to the second vibrator 260 without manual wire alignment. This fixed wiring method also ensures convenient charging and an aesthetically pleasing product. More specifically, the third metal contact 280 and the fourth metal contact 170 are magnetically attracted to each other, which makes the electrical connection between the third metal contact 280 and the fourth metal contact 170 more stable. As one of the implementation methods, the first magnetic elements 214 and the second magnetic elements 218, in one or more of the embodiments discussed herein, can be replaced with magnetic and conductive metal contacts.

In some embodiments, the first housing 112 and the second housing 116 can also be configured with one or several conductive pads, and the first housing 112 and the second housing 116 conduct electricity through the contact of the conductive pads on the two housings. Functions and/or advantages of the conductive pads are similar to advantages associated with the metal contacts.

In some embodiments, the second vibrator 260 can also be disposed on the second housing 116. The flexible massage body 108 can be provided with the insertion opening 234 for penis insertion and withdrawal and with a through hole at an end, away from the insertion opening 234. Moreover, the electrical connection element can include a conductive pin disposed within the through hole, and the first housing 112 and the second housing 116 can be provided with conductive terminals matching the conductive pin. Further, the second vibrator 260 can be electrically connected to the power component through the conductive terminals or the conductive pin once the first housing 112 and the second housing 116 are in contact with each other. Adopting this fixed wiring method, the wires are pre-fixed without any loose and exposed wires. Once the first housing 112 and the second housing 116 are closed, the power component 252 can directly supply electricity to the second vibrator 260 without manual wire alignment. This fixed wiring method also ensures convenient charging and an aesthetically pleasing product.

In some embodiments, the deformation portion **128*a* of the sexual stimulation device 100 can be disposed at least partially along partial edges of the first housing portion 120 and the second housing portion 124. Further, as described above, the first projected length, PL, of the first housing portion 120 or the second housing portion 124 onto the plane perpendicular to the length direction, L, and the second projected length, PL', of the flexible massage body 108 in the same direction of the plane are substantially the same. Moreover, the expandable and contractible connector 128 includes the first connection member 184 and the second connection member 188. At least one of the first connection member 184 and the second connection member 188** includes a deformation portion capable of undergoing folding or compression deformation when subjected to pressure.

Additionally, the first connection member 184 can be provided with a first connection portion 194 and the second connection member 188 can be provided with a second connection portion 198. The first connection portion 194 and the second connection portion 198 can be detachably connected or are connected to be openable/closable. Further, the first connection portion 194 and the second connection portion 198 can be connected by a snap-fit connection or magnetic attraction connection or hinged connection or adhesive connection.

In some embodiments, the quick connection mechanism includes a magnetic absorption component. The magnetic absorption component can include one or more of the first magnetic elements 214, which are disposed on the first housing 112, and one or more second magnetic elements 218, which are disposed on the second housing 116. The first magnetic elements 214 and the second magnetic elements 218 can be engaged (e.g., with each other) by magnetic attraction force. In other embodiments, the quick connection mechanism (such as the non-screw quick connection mechanism 230) can also include a buckle component, which can also achieve quick disassembly and assembly.

The flexible massage body 108, according to some embodiments, is at least partially detachably disposed within the housing 104. By providing a quick connection mechanism (such as the non-screw quick connection mechanism 230) connecting the first housing 112 and the second housing 116, complete separation and secure engagement of the first housing 112 and the second housing 116 are achieved through quick disassembly and assembly, which facilitates convenient replacement and washing of the flexible massage body 108, allowing for rapid disassembly and assembly of the housing 104, rapid removal of the flexible massage body 108 from the housing 104 when it needs to be cleaned or replaced, and for convenient maintenance operations of the flexible massage body 108. This also translates to rapid installation of the flexible massage body 108, in turn improving the overall assembly and disassembly efficiency. The non-screw quick connection mechanism 230 in this embodiment eliminates the screw connection method, because the screw connection method requires multiple rotations and usually requires an external tool like a screwdriver, which is time-consuming, laborious, and inconvenient. Also, a combined state of the first housing 112 and the second housing 116 after complete separation is switchable (or can be easily switched) to one or more states different from when the first housing 112 and the second housing 116 are assembled.

It should be understood that the foregoing description is only illustrative of the aspects of the disclosed embodiments. Various alternatives and modifications can be devised by those skilled in the art without departing from the aspects of the disclosed embodiments.

What is claimed is:

1. A sexual stimulation device, comprising:

a housing including at least a first housing portion, a second housing portion, and an expandable and contractible connector connecting the first housing portion and the second housing portion;

a flexible massage body, at least partially disposed within the housing, inherently having a massage cavity for receiving a penis, or having the massage cavity when the housing is closed; wherein the housing has a first end portion, a second end portion, and a middle portion between the first end portion and the second end portion, the middle portion is substantially columnar in structure, wherein the first end portion and the second end portion are opposite to each other along a length direction of the housing;

the expandable and contractible connector includes a deformation portion, the deformation portion undergoing folding or compression deformation when the first housing portion or the second housing portion is subjected to pressure applied from outside the housing towards inside of the housing; and a first projected length of the first housing portion or the second housing portion onto a plane perpendicular to the length direction of the housing and a second projected length of the flexible massage body in a same direction of the plane are substantially the same, wherein a difference between the first projected length and the second projected length is less than 30% of a greater of the two projected lengths.

2. The sexual stimulation device according to claim 1, wherein, in the plane perpendicular to the length direction of the housing, a cross-section of the deformation portion has a corrugated or wave-like shape or a Z-shaped continuous broken line shape, and the deformation portion is at least partially parallel to the length direction of the housing.

3. The sexual stimulation device according to claim 1, wherein the middle portion is an elliptical cylinder structure.

4. The sexual stimulation device according to claim 3, wherein the deformation portion is at least partially located at a major axis end, of the major axis, of the elliptical cylinder structure or a minor axis end, of the minor axis, of the elliptical cylinder structure.

5. The sexual stimulation device according to claim 1, wherein a ratio of the first projected length to the second projected length is 0.7 to 1.3.

6. The sexual stimulation device according to claim 1, wherein an outer contour of each of the first housing portion and the second housing portion is U-shaped; and/or an outer contour of the deformation portion is U-shaped.

7. The sexual stimulation device according to claim 1, wherein the expandable and contractible connector includes the deformation portion at which is at least partially located along at least part of edges of the first housing portion or the second housing portion, and an elastic portion at least partially closely attached to an inner wall of the first housing portion or the second housing portion, and wherein flexibility of the elastic portion is greater than that of the first housing portion or the second housing portion, and deformation capability of the deformation portion is greater than that of the elastic portion.

8. The sexual stimulation device according to claim 1, wherein the housing includes a first housing and a second housing, the first housing includes the first housing portion and second housing incudes the second housing portion, the first housing and the second housing are detachably connected, and the flexible massage body is detachably disposed within the housing.

9. The sexual stimulation device according to claim 8, wherein the first housing and the second housing are connected by a non-screw quick connection mechanism, and wherein the non-screw quick connection mechanism is configured to achieve complete separation and secure engagement of the first housing and the second housing through quick disassembly and assembly, for convenient replacement and washing of the flexible massage body.

10. The sexual stimulation device according to claim 1, wherein the housing supports the flexible massage body when the first end portion is located at a top of the housing, the second end portion is located at a bottom of the housing, and the first housing portion and the second housing portion are in an angled state.

11. The sexual stimulation device according to claim 10, wherein the first housing portion and the second housing portion are rotatably connected at the first end portion.

12. The sexual stimulation device according to claim 1, wherein the sexual stimulation device further includes a power component and a vibration component electrically connected to the power component, the vibration component includes at least a first vibrator and a second vibrator, the power component and the first vibrator are disposed on the first housing portion, the second vibrator is disposed on the second housing portion or on a side of the flexible massage body away from the first vibrator, and the second vibrator is electrically connected to the power component through an electrical connection element, the electrical connection element being disposed on the second housing portion or on the flexible massage body by a fixed wiring method.

13. The sexual stimulation device according to claim 1, wherein the expandable and contractible connector includes a first connection member and a second connection member, wherein at least one of the first connection member and the second connection member includes the deformation portion, and wherein the first connection member is provided with a first connection portion, the second connection member is provided with a second connection portion, and the first connection portion and the second connection portion are detachably connected or openable/closable connected.

14. The sexual stimulation device according to claim 13, wherein the first connection portion and the second connection portion are connected by a snap-fit connection or a magnetic attraction connection or a hinged connection or an adhesive connection.

15. The sexual stimulation device according to claim 1, wherein the housing includes at least a first housing and a second housing, the flexible massage body is detachably disposed within the housing, the first housing and the second housing are connected by a non-screw quick connection mechanism, the non-screw quick connection mechanism is configured to achieve complete separation and secure engagement of the first housing and the second housing through quick disassembly and assembly, for convenient maintenance operations of the flexible massage body, and wherein a combined state of the first housing and the second housing after complete separation is switchable to one or more states different from when the first housing and the second housing are assembled.

16. The sexual stimulation device according to claim 15, wherein the non-screw quick connection mechanism includes a magnetic absorption component or a buckle component.

17. The sexual stimulation device according to claim 15, wherein the first housing and the second housing are rotatably connected at the first end portion.

* * * * *